A. G. ARTZ.
PROCESS FOR THE EXTRACTION OF MINERAL SALTS AND ORGANIC CONSTITUENTS OF KELP.
APPLICATION FILED MAR. 10, 1913.
1,136,390. Patented Apr. 20, 1915.
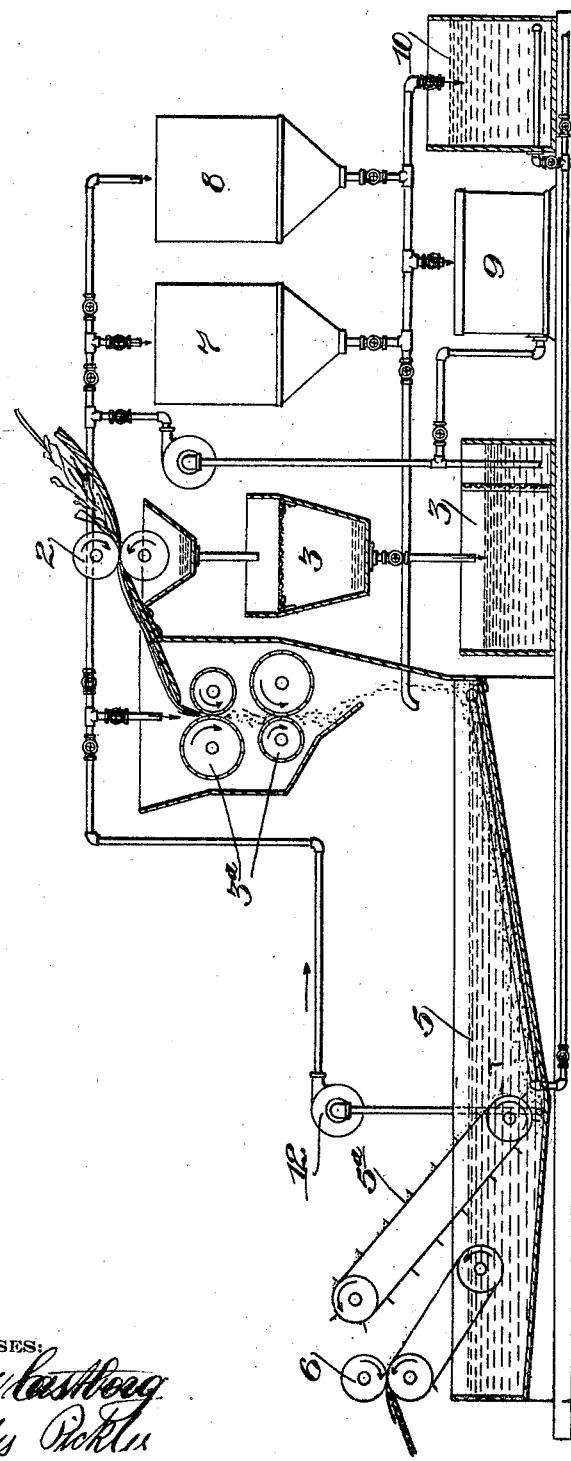

UNITED STATES PATENT OFFICE.

ADOLPHE G. ARTZ, OF SAN FRANCISCO, CALIFORNIA, ASSIGNOR, BY DIRECT AND MESNE ASSIGNMENTS, TO KELP PRODUCTS COMPANY, OF SAN FRANCISCO, CALIFORNIA, A CORPORATION OF CALIFORNIA.

PROCESS FOR THE EXTRACTION OF MINERAL SALTS AND ORGANIC CONSTITUENTS OF KELP.

1,136,390.

Specification of Letters Patent.

Patented Apr. 20, 1915.

Application filed March 10, 1913. Serial No. 753,234.

*To all whom it may concern:*

Be it known that I, ADOLPHE G. ARTZ, a citizen of the United States, residing in the city and county of San Fracisco and State of California, have invented new and useful Improvements in Processes for the Extraction of Mineral Salts and Organic Constituents of Kelp, of which the following is a specification.

This process relates to a direct lixiviation process or a direct separation and solution of the different constituents of kelp or seaweed while in the raw or harvested state.

The object of the invention is to provide a method and apparatus whereby the raw or undried kelp, as it comes fresh from the sea, may be immediately treated and separated into its various mineral and organic constituents without drying, burning, charring, or the addition of water for leaching purposes.

Having reference to the accompanying drawing—the drawing is a diagrammatic view of the apparatus employed.

Referring to the drawing, it will be seen that the kelp is first passed through a series of pressure rollers or equivalent means indicated at 2, where the greater part of the water or juices, together with the several mineral salts and organic compounds held in solution, are separated from the solid matter, which latter consists mostly of insoluble organic matter. The expressed liquid is then collected in a tank 3, while the solid material is fed into a series of disintegrating or macerating rollers 3ª where it is thoroughly worked into a pulp. The solid matter in the form of a pulp is then conveyed to a boiling vat or tank, indicated at 5, where it is boiled from four to six hours in an alkaline carbonate solution. The algin or alginic acid, together with the soluble salts which were not extracted by pressure, are thus thoroughly dissolved, leaving a residue of cellulose or cellulose-like material which is removed from the tank or boiling vat by suitable means, as a screen belt 5ª. This conveys the pulp to a pair of compression rollers 6, where all the liquid and moisture is removed; the liquid being returned to the tank while the pulp is discharged from the pressure rollers as a high-grade cellulose which is very adaptable for the paper industry.

The alkaline solution contained in the boiling vat 5 is obtained from one or the other of a pair of tanks indicated at 7 and and 8, after the liquid contained in same has been subjected to the following treatment: The liquid expressed by passing the kelp through the pressure rollers, after being collected in tank 3, is stored a sufficient time to allow the settlement of any sands or foreign matter which may be mixed with the liquid. The clarified liquid is then pumped or otherwise conveyed to one or the other of the tanks 7 or 8, where it is treated with a sulfuric acid solution to settle the algin contained in the liquid.

In general practice it has been found that the best results are obtained with acid of specific gravity 1.06. The quantity, however, is subject to variations when treating different varieties of kelp; the proportion changing according to the alginic contents of the kelp. As before described, sulfuric acid of specific gravity 1.06 is added to the solution contained in one or the other of the tanks 7 and 8 and allowed to remain until the algin has been thoroughly precipitated. The contents is then filtered by being passed through the filter 9, where the algin is separated from the liquid, being afterward washed and dried, while the remaining liquid is again returned to one or the other of the tanks 7 or 8 where powdered carbonate of lime is added until all free acid is neutralized, which point is reached when effervescence is no longer produced. To this liquid is now added fifteen pounds of sodium carbonate for every one hundred gallons of liquid. This liquid is then conveyed to the boiling tank or vat 5 and is used as a solvent for the purpose of dissolving any of the mineral salts or organic compounds remaining in the pulp. The boiling vat 5 is of considerable length, the length varying according to the capacity of the plant, being in most instances from one hundred to two hundred feet.

The pulp delivered to the tank from the macerating rollers is gradually advanced by skilful attendants, and the time consumed in advancing the pulp from the beginning of the tank to the screen belt 6 averages about six hours. The solution contained in the boiling vat 5 is gradually concentrated by evaporation. It therefore becomes necessary at certain time intervals to remove the liquid, as it would soon become so concentrated as to crystallize and deposit salts in the outgoing pulp. The concentrated liquid contained in the boiling vat is then returned to one or the other of the tanks 7 or 8 where it is again treated by the addition of sulfuric acid, a sufficient amount being added to precipitate the algin absorbed in the boiling vat. The solution is then passed through the filter 9 to separate the algin, while the remaining liquid is conveyed to a tank where the free acid is neutralized by the addition of sodium or potassium carbonate. The highly concentrated solution is then conveyed to an evaporating tank 10, of the usual type, where the various salts, such as potassium sulfate, sodium sulfate, calcium sulfate, magnesium sulfate, magnesium chlorid, sodium iodid, are removed by the usual manner of evaporation. The boiling vat is again supplied with a new charge of alkaline solution obtained from one or the other of the tanks 7 or 8. The process is thus continuous and may be operated indefinitely without stopping; the various tanks shown being provided for the purpose of conducting the different steps of the process so as not to interfere with the continuous operation of the apparatus.

By referring to the drawings, and in particular to the reference numeral 12, it will be seen that a pump is provided for the purpose of continuously forcing a portion of the alkaline solution through the macerating rollers, as it has been found that the addition of a small amount of liquid will materially assist the macerating process.

The heating of the boiling vat 5, together with the final evaporating tank, may be accomplished in any suitable manner, but preferably by the steam heating system here shown.

By treating kelp with the process described practically everything is saved. The great loss of salts by efflorescence is entirely eliminated as the kelp is never given an opportunity to dry, and by eliminating burning or charring it becomes possible to save all the algin and cellulose contained in same.

Having thus described my invention, what I claim and desire to secure by Letters Patent is—

1. The continuous process of treating raw kelp, which consists in subjecting the raw, fresh kelp to pressure to remove the expressible liquids, then removing the algin from the expressed liquid, then macerating the remaining solids and treating said solids with said liquid during maceration, after the algin has been removed, to extract the remaining algin and salts, and then boiling in a vat for several hours and constantly removing the cellulose from said vat.

2. The continuous process of treating raw kelp, which consists in subjecting the raw, fresh kelp to pressure to remove the expressible liquids and leave the solids; then treating the expressed juice with sulfuric acid to precipitate the algin; neutralizing the liquid separated from the precipitated algin with carbonate of lime; rendering said neutralized liquid alkaline metal with alkaline carbonate; macerating said solids with the alkaline liquid, to further extract the remaining algin and salts, and then boiling for several hours to precipitate the cellulose, said cellulose being removed as it is precipitated.

3. The continuous process of treating raw kelp, which consists in subjecting the raw, fresh kelp to pressure to remove the expressible liquids and leave a pulp; then treating the expressed juice with sulfuric acid to precipitate the algin; neutralizing the liquid separated from the precipitated algin with carbonate of lime; rendering said neutralized liquid alkaline with alkaline metal carbonate; then disintegrating the pulp, and treating said disintegrated pulp with the last named liquid for the purpose of extracting the therein remaining algin and soluble salts and continuously removing the cellulose freed during such treatment.

4. The continuous process of treating raw kelp which consists in subjecting the kelp to pressure to separate the liquid contents from the solid organic matter, collecting the expressed liquid, treating the expressed liquid with a solution of sulfuric acid to precipitate the algin contained in the liquid, separating the algin from the liquid by filtration, adding sufficient carbonate of lime to the liquids to neutralize the acid, and evaporating the same to remove the salts.

5. The continuous process of treating raw kelp for the purpose of separating it into its various mineral and organic constituents which consists in subjecting the kelp to pressure to separate the liquid contents from the solid organic structure, collecting the expressed liquids separately from the solids, treating the collected liquid with a solution of sulfuric acid to precipitate the algin contained in the liquid, separating the algin from the liquid by filtration, adding sufficient carbonate of lime to neutralize the acid, then adding five to fifteen pounds per one hundred gallons of sodium carbonate, macerating the solids to a pulp, treating the solids with said liquid during maceration, boiling the pulp for approximately six hours in the sodium carbonate solution before obtained to further extract algin and soluble salts contained in the pulp, separating the solution so obtained from the cellulose by pressure, treating same with sufficient sulfuric acid to precipitate the dissolved algin, filtering the solution to remove the secondary precipitation of algin, adding sufficient carbonate of lime to the liquid to neutralize the acid, and evaporating the same to remove the salts.

In testimony whereof I have hereunto set my hand in the presence of two subscribing witnesses.

ADOLPHE G. ARTZ.

Witnesses:
W. W. HEALEY,
ZOE HARRISON.